(12) United States Patent
Visconti et al.

(10) Patent No.: US 12,714,022 B2
(45) Date of Patent: Aug. 25, 2026

(54) AGRICULTURAL SYSTEM AND METHOD FOR REMOVING TRASH FROM A FLOW OF HARVESTED CROP WITHIN AN AGRICULTURAL HARVESTER

(71) Applicant: CNH Industrial America LLC, New Holland, PA (US)

(72) Inventors: Carlos Eduardo de Carvalho Visconti, São Paulo (BR); Willem Laurens Kraak, Hoofddorp (NL); Bart M.A. Missotten, Herent (BE); Dré W.J. Jongmans, Klundert (BE)

(73) Assignee: CNH Industrial America LLC, New Holland, PA (US)

( * ) Notice: Subject to any disclaimer, the term of this patent is extended or adjusted under 35 U.S.C. 154(b) by 181 days.

(21) Appl. No.: 18/713,495

(22) PCT Filed: Nov. 17, 2022

(86) PCT No.: PCT/BR2022/050444
§ 371 (c)(1),
(2) Date: May 24, 2024

(87) PCT Pub. No.: WO2023/092204
PCT Pub. Date: Jun. 1, 2023

(65) Prior Publication Data

US 2025/0017142 A1 Jan. 16, 2025

(30) Foreign Application Priority Data

Nov. 25, 2021 (BR) .......................... 1020210237058

(51) Int. Cl.
*A01D 41/12* (2006.01)
*A01D 41/127* (2006.01)
(Continued)

(52) U.S. Cl.
CPC ..... *A01D 41/1276* (2013.01); *A01D 41/1252* (2013.01); *A01D 45/10* (2013.01); *A01D 61/008* (2013.01); *A01D 61/04* (2013.01)

(58) Field of Classification Search
CPC ............ A01D 41/1276; A01D 41/1252; A01D 41/1208; A01D 41/1217; A01D 45/10; A01D 61/008; A01D 61/02; A01D 61/04
See application file for complete search history.

(56) References Cited

U.S. PATENT DOCUMENTS 5,953,891 A * 9/1999 Leigers .................. A01D 45/10 460/99
2014/0295923 A1 10/2014 Vergote
(Continued)

FOREIGN PATENT DOCUMENTS

BR 8500441 U 10/2006
BR 8800895 U2 10/2010

OTHER PUBLICATIONS

International Search Report and Written Opinion for PCT Application No. PCT/BR2022/050444 dated Feb. 13, 2023 (11 pages).

*Primary Examiner* — Joseph M Rocca
*Assistant Examiner* — Robert E Pezzuto
(74) *Attorney, Agent, or Firm* — Dority & Manning, P.A.

(57) ABSTRACT

A system for removing trash from a flow of harvested crop within an agricultural harvester may include a chopper assembly and a cleaning assembly downstream of the chopper assembly relative to the flow of harvested crop. An upstream side of the cleaning assembly may be positioned closer to the chopper assembly than a downstream side of the cleaning assembly. The cleaning assembly may include a screen and a fan, with the fan positioned at least partially between the upstream and downstream sides of the cleaning assembly. The fan may generate a flow of air in a first direction such that the flow of air passes through the
(Continued)

upstream side before the downstream side of the cleaning assembly. Additionally, the screen may be movable along a travel path relative to the fan such that a portion of the screen is movable between the upstream and downstream sides of the cleaning assembly.

20 Claims, 6 Drawing Sheets

(51) Int. Cl.

| | |
|---|---|
| ***A01D 45/10*** | (2006.01) |
| ***A01D 61/00*** | (2006.01) |
| ***A01D 61/04*** | (2006.01) |

(56) References Cited

U.S. PATENT DOCUMENTS

2019/0373814 A1 12/2019 Murray
2021/0084818 A1 * 3/2021 Poelling ............ A01D 41/1272

* cited by examiner

AGRICULTURAL SYSTEM AND METHOD FOR REMOVING TRASH FROM A FLOW OF HARVESTED CROP WITHIN AN AGRICULTURAL HARVESTER

FIELD OF THE INVENTION

The present disclosure relates generally to agricultural harvesters, such as sugarcane harvesters, and, more particularly, to agricultural systems and methods for removing trash from a flow of harvested crop within an agricultural harvester.

BACKGROUND OF THE INVENTION

Typically, agricultural harvesters include an assembly of processing equipment for processing harvested crop materials. For instance, within a sugarcane harvester, severed sugarcane stalks are conveyed via a feed roller assembly to a chopper assembly that cuts or chops the sugarcane stalks into pieces or billets (e.g., 6 inch cane sections). The processed crop material discharged from the chopper assembly is then directed as a stream of billets and debris into a primary extractor assembly, within which the airborne debris (e.g., dust, dirt, leaves, etc.) is separated from the sugarcane billets. The separated/cleaned billets then fall into an elevator assembly for delivery to an external storage device.

The primary extractor assembly typically includes a fan in a hood that extends vertically above the chopper assembly and the start of the elevator assembly. However, the fan of the primary extractor assembly becomes less efficient the more trash or debris flows therethrough, especially in instances where the fan is a radial fan. As such, less trash is removed from the flow of billets being received by the elevator assembly than desired.

Accordingly, an improved system and method for removing trash from a flow of harvested crop within an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for removing trash from a flow of harvested crop within an agricultural harvester. The system has a chopper assembly and a cleaning assembly downstream of the chopper assembly relative to the flow of harvested crop. An upstream side of the cleaning assembly is positioned closer to the chopper assembly than a downstream side of the cleaning assembly. The cleaning assembly includes a screen and a fan, with the fan being positioned at least partially between the upstream and downstream sides of the cleaning assembly. The fan is configured to generate a flow of air in a first direction such that the flow of air passes through the upstream side of the cleaning assembly before the downstream side of the cleaning assembly. Additionally, the screen is movable along a travel path relative to the fan such that a first portion of the screen is movable between the upstream side and the downstream side of the cleaning assembly.

In another aspect, the present subject matter is directed to a cleaning assembly for removing trash from a flow of harvested crop within an agricultural harvester. The cleaning assembly includes a screen extending in a continuous loop between an upstream side and a downstream side of the cleaning assembly. The cleaning assembly further includes a drive device configured to move the screen along a looped travel path, with the looped travel path defining an interior volume between the upstream and downstream sides of the cleaning assembly. Additionally, the cleaning assembly includes a fan positioned within the interior volume. The fan is configured to generate a flow of air in a first direction such that the flow of air passes through the upstream side of the cleaning assembly before the downstream side of the cleaning assembly.

In an additional aspect, the present subject matter is directed to a method for removing trash from a flow of harvested crop within an agricultural harvester using a cleaning assembly downstream of a chopper assembly of the agricultural harvester relative to the flow of harvested crop. An upstream side of the cleaning assembly is positioned closer to the chopper assembly than a downstream side of the cleaning assembly. The cleaning assembly includes a screen and a fan, with the fan being positioned at least partially between the upstream and downstream sides of the cleaning assembly. The method includes controlling, with one or more computing devices, an operation of a drive device to move the screen along a travel path relative to the fan such that a first portion of the screen is movable between the upstream side and the downstream side of the cleaning assembly. Additionally, the method includes controlling, with the one or more computing devices, an operation of a fan to generate a flow of air in a blowing direction such that the flow of air passes through the upstream side of the cleaning assembly before the downstream side of the cleaning assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
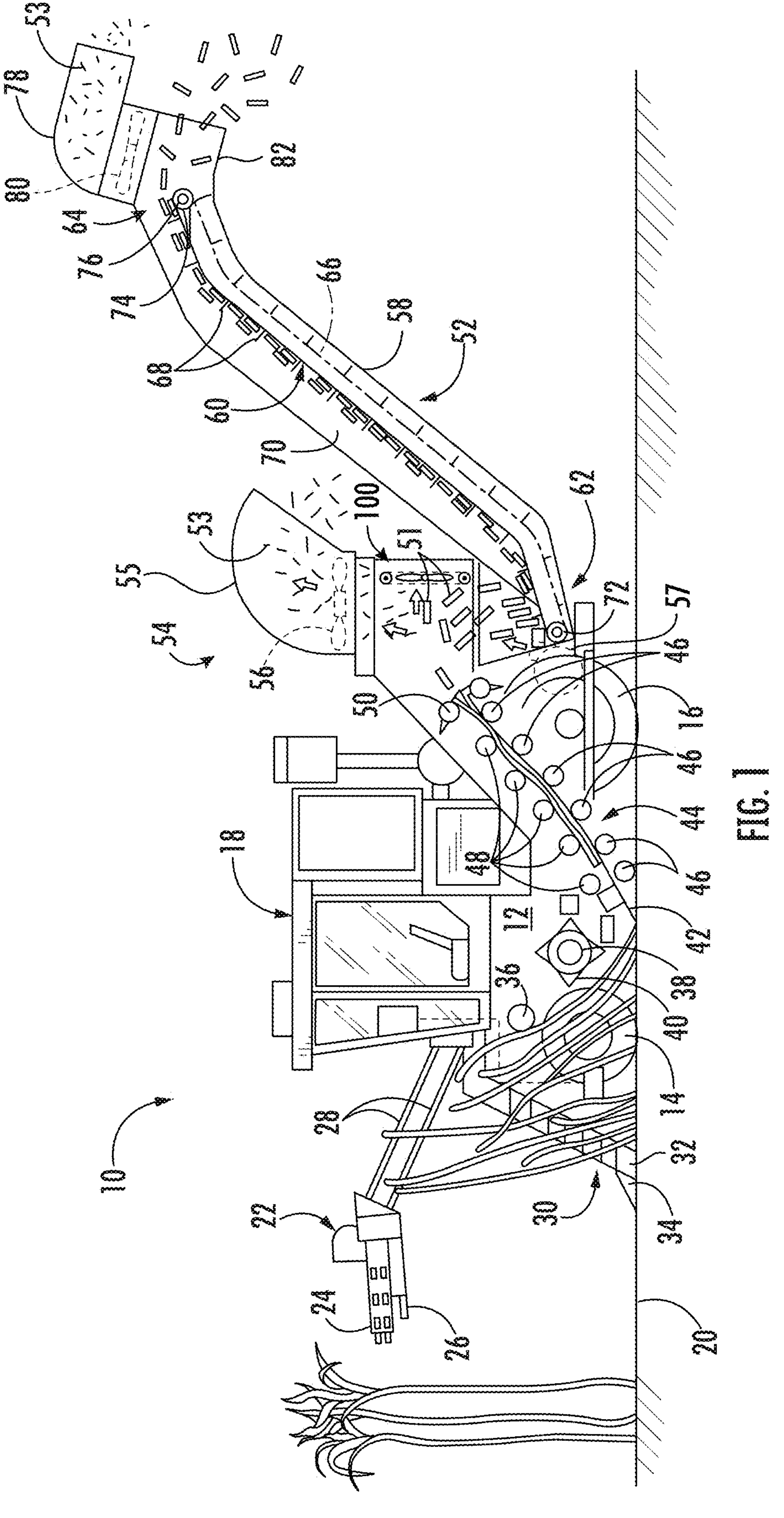
FIG. 1 illustrates a simplified, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for removing trash from a flow of harvested crop within an agricultural harvester, such as a sugarcane harvester. Particularly, in several embodiments, the disclosed agricultural systems and methods may be used to increase the amount of trash removed from the flow of harvested crop that is received by the elevator assembly of the agricultural harvester. For instance, a cleaning assembly may be positioned downstream of a chopper assembly relative to the flow of harvested crop, with an upstream side of the cleaning assembly being positioned closer to the chopper assembly than a downstream side of the cleaning assembly. The cleaning assembly generally includes a fan and a screen. The fan is positioned at least partially between the upstream and downstream sides of the cleaning assembly and generates a flow of air in a blowing direction such that the flow of air passes through the upstream side of the cleaning assembly before passing through the downstream side of the cleaning assembly. The screen is movable along a travel path relative to the fan such that a portion of the screen is movable between the upstream side and the downstream side of the cleaning assembly. As such, trash from the flow of harvested material may be held by the flow of air generated by the fan against a first portion of the screen positioned at the upstream side of the cleaning assembly and continue to be held such that the trash moves with the screen as the screen moves along the travel path from the upstream sides to the downstream side, where the trash is blown off the first portion of the screen by the flow of air when the first portion of the screen reaches the downstream side of the cleaning assembly. The trash blown off of the first portion of the screen is then exhausted from the agricultural harvester (e.g., through an outlet) such that the cleaned crop falls onto the elevator assembly contains little to no trash. Such cleaning assembly is thus self-cleaning, such that it does not lose efficiency from trash building up over time. In some embodiments, the cleaning assembly may be used in addition to or in place of a primary extractor assembly such that the primary extractor assembly may be less likely to be overloaded and thus, maintain efficiency. Additionally, in some instances, the cleaning assembly alone, or in addition to the primary extractor assembly, may even be efficient enough to remove the need for the secondary extractor assembly at an outlet end of the elevator assembly.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

The harvester 10 may include various components for cutting, processing, cleaning, and discharging sugarcane as the cane is harvested from an agricultural field 20. For instance, during operation, the harvester 10 is traversed across an agricultural field 20 for harvesting crop, such as sugarcane. The harvester 10 may include a topper assembly 22 positioned at its front end to intercept sugarcane as the harvester 10 is moved in the forward direction. As shown, the topper assembly 22 may include both a gathering disk 24 and a cutting disk 26. The gathering disk 24 may be configured to gather the sugarcane stalks so that the cutting disk 26 may be used to cut off the top of each stalk. As is generally understood, the height of the topper assembly 22 may be adjustable via a pair of arms 28 hydraulically raised and lowered, as desired, by the operator. After the height of the topper assembly 22 is adjusted via the arms 28, the gathering disk 24 on the topper assembly 22 may function to gather the sugarcane stalks as the harvester 10 proceeds across the field 20, while the cutter disk 26 severs the leafy tops of the sugarcane stalks for disposal along either side of harvester 10.

The harvester 10 may further include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugarcane stalks for harvesting. As the stalks enter the crop divider 30, the ground shoes 34 may set the operating width to determine the quantity of sugarcane entering the throat of the harvester 10. The spiral feed rollers 32 then gather the stalks into the throat to allow a knock-down roller 36 to bend the stalks downwardly in conjunction with the action of a fin roller 38. The knock-down roller 36 is positioned near the front wheels 14 and the fin roller 38 positioned behind or downstream of the knock-down roller 36. As the knock-down roller 36 is rotated, the sugarcane stalks being harvested are knocked down. The fin roller 38 may include a plurality of intermittently mounted fins 40 that assist in forcing the sugarcane stalks downwardly. For instance, as the fin roller 38 is rotated, the sugarcane stalks that have been knocked down by the knock-down roller 36 are separated and further knocked down by the fin roller 38 as the harvester 10 continues to be moved in the forward direction relative to the field 20.

Once the stalks are angled downwardly as shown in FIG. 1, a base cutter assembly 42 may then sever the base of the stalks from field 20. The base cutter assembly 42 is positioned behind or downstream of the fin roller 38. As is generally understood, the base cutter assembly 42 may include blades (not shown) for severing the sugarcane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugarcane as the cane is knocked down by the fin roller 38.

The severed stalks are then, by movement of the harvester 10, directed to a feed roller assembly 44 located downstream of the base cutter assembly 42 for moving the severed stalks of sugarcane from base cutter assembly 42 along the processing path. As shown in FIG. 1, the feed roller assembly 44 may include a plurality of bottom rollers 46 and a plurality of opposed, top pinch rollers 48. The harvested sugarcane may be pinched between various bottom and top rollers 46, 48 to make the sugarcane stalks more uniform and to convey the harvested sugarcane rearwardly (downstream) during transport. As the sugarcane is transported through the feed roller assembly 44, debris (e.g., rocks, dirt, and/or the like) may be allowed to fall through bottom rollers 46 onto the field 20.

At the downstream end of the feed roller assembly 44 (e.g., adjacent to the rearward-most bottom and top rollers 46, 48), a chopper assembly 50 may cut or chop the compressed sugarcane stalks. In general, the chopper assembly 50 may be used to cut the sugarcane stalks into pieces or "billets" 51, which may be, for example, six (6) inches long. The billets 51 may then be propelled towards an elevator assembly 52 of the harvester 10 for delivery to an external receiver or storage device (not shown).

As is generally understood, a primary extractor assembly 54 may be provided to help separate pieces of debris 53 (e.g., dust, dirt, leaves, etc.) from the sugarcane billets 51 before the billets 51 are received by the elevator assembly 52. The primary extractor assembly 54 is located immediately behind or downstream of the chopper assembly 50 relative to the flow of harvested crop and is oriented to direct the debris 53 outwardly from the harvester 10. The primary extractor assembly 54 may include an extractor fan 56 mounted within a housing 55 for generating a suction force or vacuum sufficient to separate and force the debris 53 through an inlet of the housing 55 into the primary extractor assembly 54 and out of the harvester 10 via an outlet of the housing 55. The separated or cleaned billets 51 are heavier than the debris 53 being expelled through the extractor 54, so the billets 51 may fall downward to the elevator assembly 52 instead of being pulled through the primary extractor assembly 54.

In some embodiments, an agitator fan 57 may be provided to disperse and direct the flow of crop materials exiting the chopper assembly 50. For instance, the agitator fan 57 may be positioned below the chopper assembly 50 and configured to generate a flow of air upwards towards the primary extractor assembly 54. By dispersing the flow of crop materials directed toward the primary extractor assembly 54, the primary extractor assembly 54 may better separate the trash from the billets. In one embodiment, the agitator fan 57 may be configured as a centrifugal fan, however, the agitator fan 57 may otherwise be configured as any other suitable type of fan.

As further shown in FIG. 1, the elevator assembly 52 may include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugarcane billets 51 on the elevator 60 as the billets are elevated along a top span of the elevator 70 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, in some embodiments, pieces of debris or trash 53 (e.g., dust, dirt, leaves, etc.) separated from the elevated sugarcane billets 51 may be expelled from the harvester 10 through a secondary extractor assembly 78 coupled to the rear end of the elevator housing 58. For example, the debris 53 expelled by the secondary extractor assembly 78 may be debris remaining after the billets 51 are cleaned and debris 53 expelled by the primary extractor assembly 54. As shown in FIG. 1, the secondary extractor assembly 78 may be located adjacent to the distal end 64 of the elevator 60 and may be oriented to direct the debris 53 outwardly from the harvester 10. Additionally, an extractor fan 80 may be mounted at the base of the secondary extractor assembly 78 for generating a suction force or vacuum sufficient to pick up the debris 53 and force the debris 53 through the secondary extractor assembly 78. The separated, cleaned billets 51, heavier than the debris 53 expelled through the extractor 78, may then fall from the distal end 64 of the elevator 60. Typically, the billets 51 may fall downwardly through an elevator discharge opening 82 of the elevator assembly 52 into an external storage device (not shown), such as a sugarcane billet cart.

As will be described in greater detail below, in accordance with aspects of the present subject matter, a cleaning assembly 100 may be provided for removing trash from the flow of harvested crop processed by the chopper assembly 50. The cleaning assembly 100 is positioned downstream of the chopper assembly 50 relative to the flow of crop exiting the chopper assembly 50. The cleaning assembly 100 is oriented such than an upstream side of the cleaning assembly 100 is positioned closer to the chopper assembly 50 than a downstream side of the cleaning assembly 100. The cleaning assembly 100 may generally include a fan and a screen, where the fan is positioned at least partially within an interior volume defined by the screen, and where the screen is movable relative to the fan. The fan may generate a flow of air that flows through the upstream side before flowing through the downstream side of the cleaning assembly 100 such that debris 53 is held against a portion of the positioned along the upstream side of the cleaning assembly, and then blown off the portion of the screen by the flow of air when the portion of the screen is moved to be positioned along the downstream side of the cleaning assembly 100. The debris 53 blown off the screen may then exit out of the agricultural harvester at an outlet proximate the downstream side of the cleaning assembly 100. The cleaning assembly 100 may be used in combination with or in place of the primary extractor assembly 54 to improve the overall efficiency with which trash is separated from the billets 51 and removed from the agricultural harvester 10.

Figure 2:
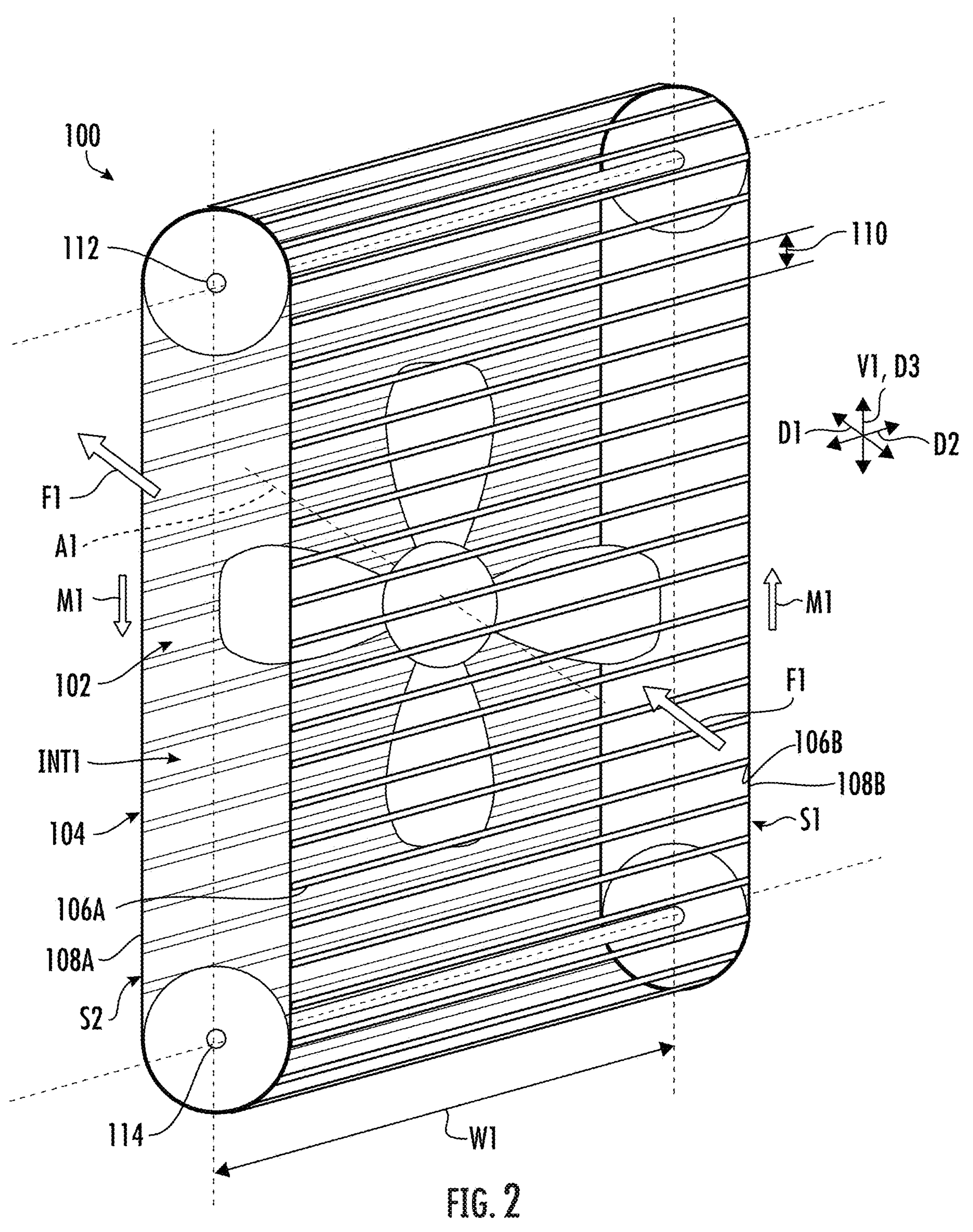
FIGS. 2-5 illustrate various views of one embodiment of a cleaning assembly for use within an agricultural harvester in accordance with aspects of the present subject matter.
Figure 3:
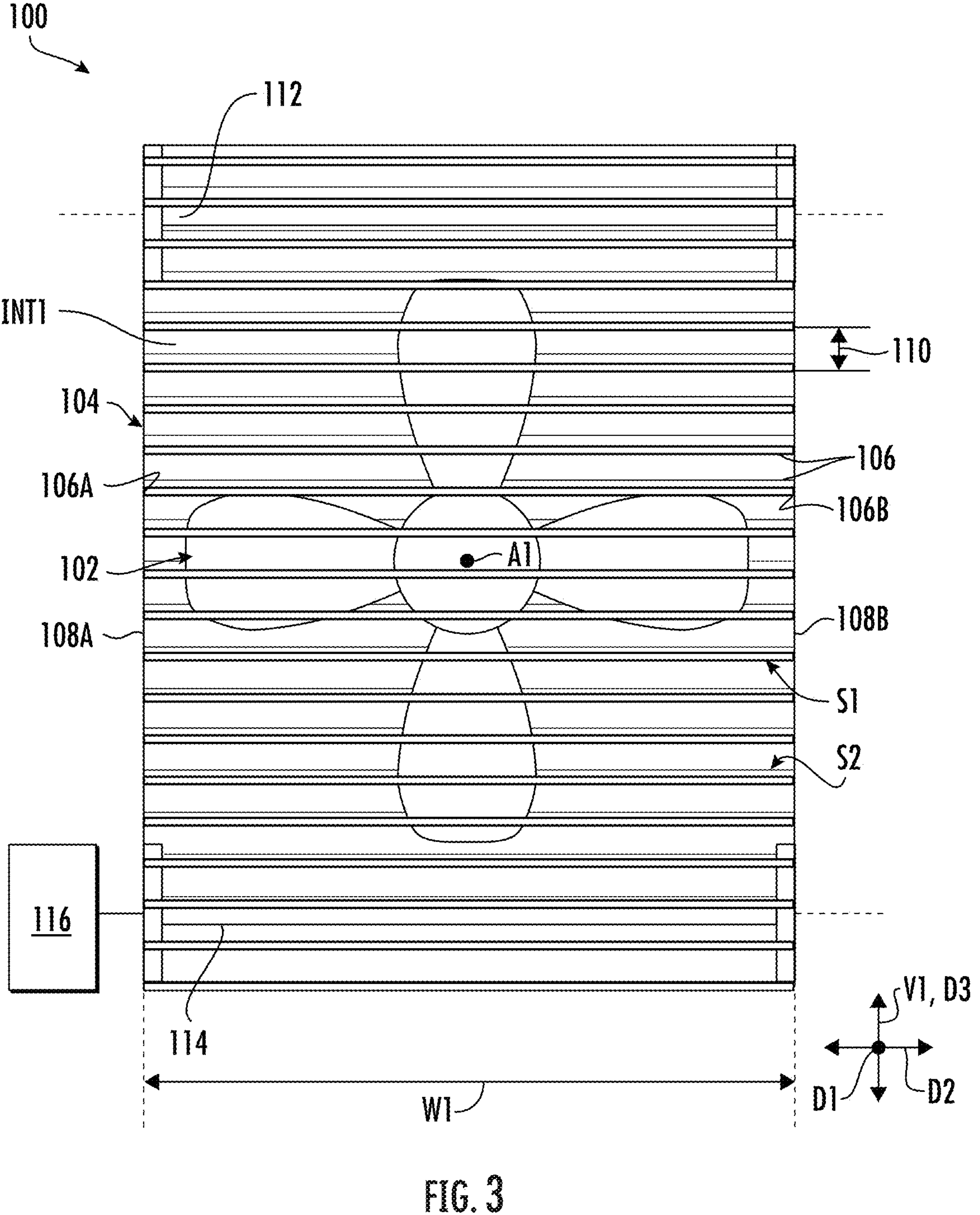
Figure 4:
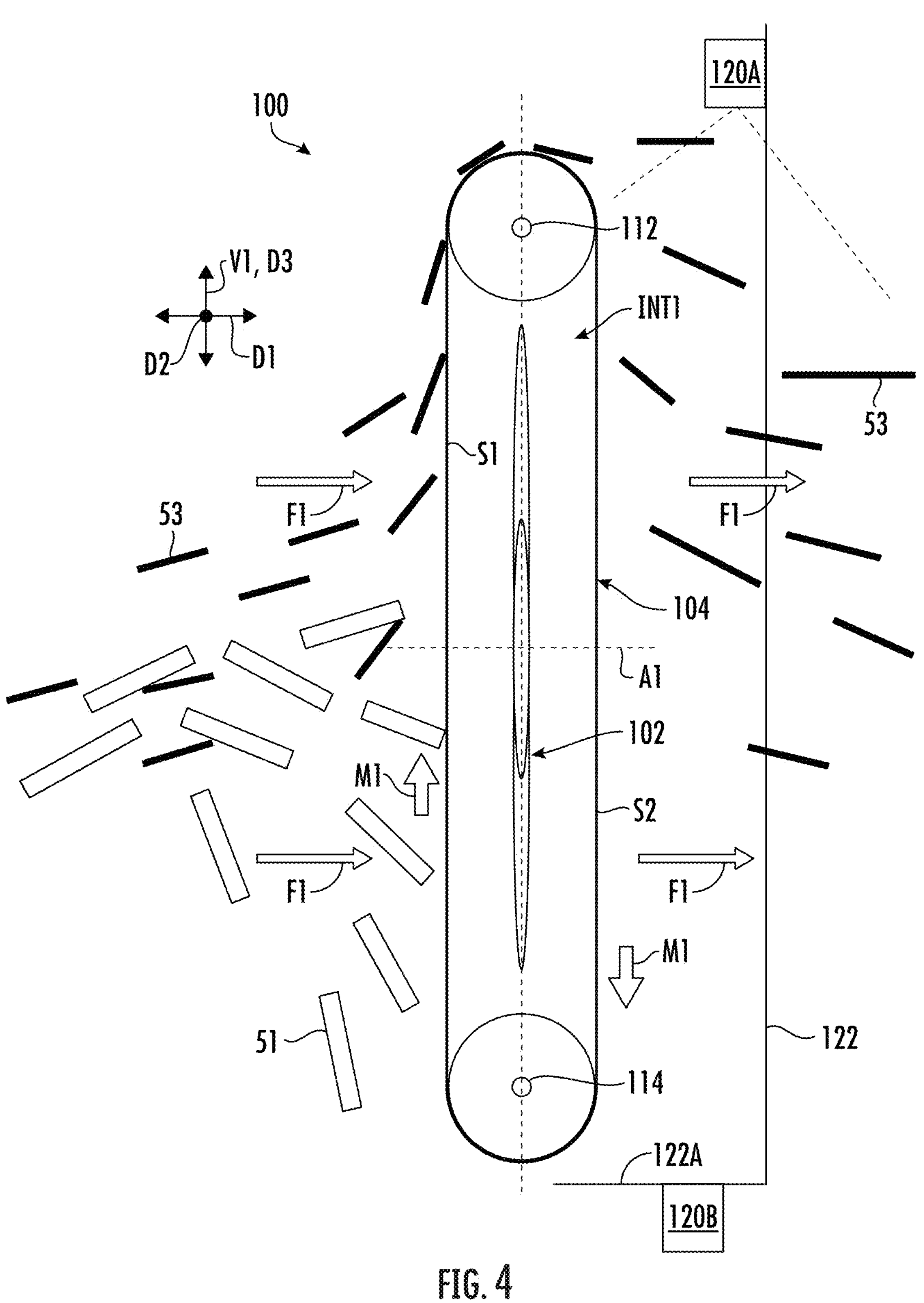
Figure 5:
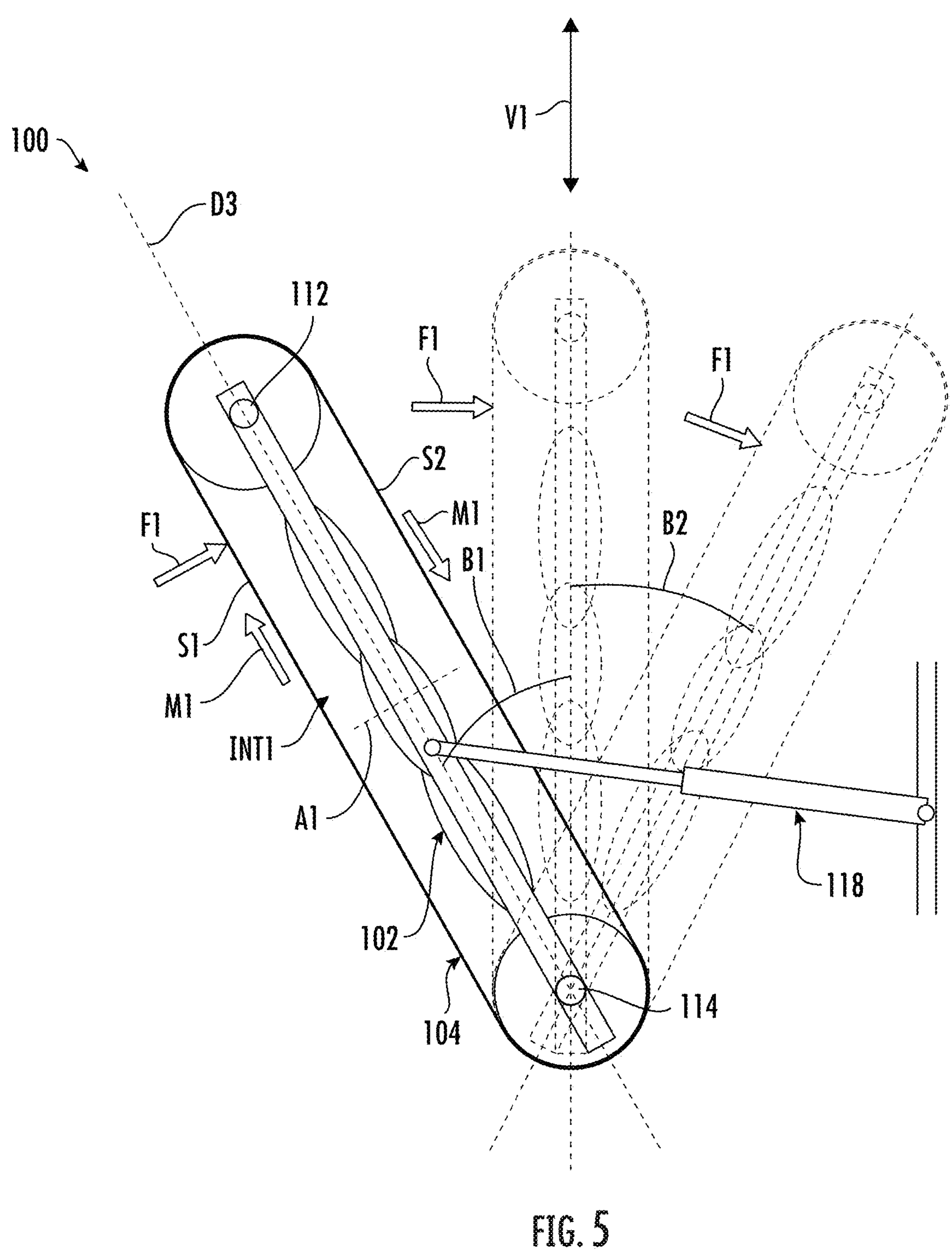

Referring now to FIGS. 2-5, various views of one embodiment of the cleaning assembly 100 are illustrated in accordance with aspects of the present subject matter. More particularly, FIG. 2 illustrates a perspective view of the cleaning assembly 100, FIG. 3 illustrates a front view of the cleaning assembly 100, FIG. 4 illustrates a side view of the cleaning assembly 100, and FIG. 5 illustrates a partial side view of the cleaning assembly 100 with the cleaning assembly in different operational positions.

As indicated above, the cleaning assembly 100 is configured to remove trash from the flow of harvested crop processed by the chopper assembly 50 (FIG. 1). As such, the cleaning assembly 100 is positioned downstream of the chopper assembly 50 (FIG. 1) relative to the flow of harvested crop exiting the chopper assembly 50. An upstream side S1 of the cleaning assembly 100 is generally positioned closer to the chopper assembly 50 (FIG. 1) than a downstream side S2 of the cleaning assembly 100. The cleaning assembly 100 generally includes a fan 102 and a screen 104. The fan 102 is configured to rotate about an axis A1 to generate a flow of air (as shown with arrows F1) along a first or blowing direction D1 that is substantially parallel to the rotational axis A1. The first direction D1 is configured such that the flow of air F1 passes through the upstream side S1 of the cleaning assembly 100 before passing through the downstream side S2 of the cleaning assembly 100. Particularly, the fan 102 is positioned between the upstream and downstream sides S1, S2 of the cleaning assembly 100. In one embodiment, the fan 102 is a radial fan. However, it should be appreciated that the fan 102 may be any other suitable type of fan.

The screen 104 is movable along a travel path relative to the fan 102 such that a portion of the screen 104 is movable from the upstream side S1 to the downstream side S2 of the cleaning assembly 100. The travel path of the screen 104 at least partially defines an interior volume INT1 between the upstream and downstream sides S1, S2 of the cleaning assembly, where the fan 102 is positioned at least partially within the interior volume INT1. For instance, in the illustrated embodiment, the screen 104 is a continuous, looped screen where the travel path is a continuous, looped travel path. Particularly, the screen 104 may be moved along the looped travel path such that a portion of the looped screen 104 initially on the upstream side S1 is moved to the downstream side S2, and, vice versa, that the portion of the looped screen 104 initially on the downstream side S2 is moved to the upstream side S1. In such embodiments, the fan 102 may be positioned at least partially within the within the interior volume INT1 defined, at least in part, between the portion of the screen 104 on the upstream side S1 and the portion of the screen 104 on the downstream side S2. By positioning the fan 102 within the interior volume INT1, the fan 102 may be prevented from being clogged or overloaded, which helps maintain the airflow capacity of the fan 102. It should be appreciated that an exterior side of the portion of the screen 104, facing away from the interior volume INT1 and being further from the fan 102 relative to an interior side of the screen 104 when on the upstream side S1 is still the exterior side of the portion of the screen 104 when on the downstream side S2 of the cleaning assembly 100.

The screen 104 is oriented relative to the fan 102 such that the flow of air F1 may pass therethrough as the flow of air F1 passes through the cleaning assembly 100. More particularly, the screen 104 has a width W1 extending along a second direction D2, with the second direction D2 being oriented at an angle relative to the first direction D1. In one embodiment, the second direction D2 is perpendicular to the first direction D1. However, it should be appreciated that the second direction D2 may be oriented at any other suitable angle relative to the first direction D1, such that the flow of air F1 is directed through any portion of the screen 104 on the upstream side S1 of the cleaning assembly 100 before flowing through any portion of the screen 104 on the downstream side S2 of the cleaning assembly 100.

In one embodiment, as shown in FIGS. 2 and 3, the screen 104 has a plurality of screen members, such as screen bars 106. The screen bars 106 may extend longitudinally between a first end 106A and a second end 106B. In one embodiment, the screen bars 106 extend parallel to the second direction D2. However, the screen bars 106 may extend in any direction or combination of directions. In some embodiments, the screen 104 further includes connectors 108 for connecting the screen bars 106. For instance, in embodiments, where the screen 104 is a continuous, looped screen, the screen 104 may include a first connector, such as a first loop 108A, connected to each of the screen bars 106 proximate the first ends 106A of the screen bars 106, and a second connector, such as a second loop 108B similarly connected to each of the screen bars 106 proximate the second ends 106B of the screen bars 106. It should be appreciated that the screen bars 106 may be connected to form the screen 104 in any other suitable manner. Preferably, directly adjacent screen bars 106 may be spaced apart from each other (e.g., along the loops 108A, 108B) by a spacing distance 110. The spacing distance 110 may generally be smaller than an average smallest dimension (e.g., length, diameter, etc.) of crop processed by the chopper 50 (FIG. 1) such that a majority of the crop 51 cannot pass through the screen 104. However, the spacing distance 110 may otherwise be selected to be as small as possible such that the flow of air F1 through the screen 104 is sufficient is still sufficient to hold trash 53 against the upstream side S1 of the screen 104.

In some embodiments, the travel path may extend around one or more shafts. For instance, in one embodiment, the looped screen 104 may extend around a first shaft 112 and a second shaft 114. The first and second shafts 112, 114 may generally extend parallel to and along the second direction D2. The first and second shafts 112, 114 are spaced apart along a third direction D3, with the third direction being perpendicular to the second direction D2. In some embodiments, one or both of the shafts 112, 114 may be configured to be driven (e.g., rotated) by a screen drive 116 (FIG. 3) (e.g., a rotary motor, rack-and-pinion, etc.) to move the screen 104 along the travel path. However, it should be appreciated that the screen 104 may be moved along the travel path by the screen drive 116 in any other suitable way. As will be described below in greater detail, the speed at which the screen drive 116 moves the screen 104 along the travel path may be adjustable. In one embodiment, the second direction D2 extends at an angle relative to vertical direction V1. For instance, the second direction D2 may extend substantially horizontally (e.g., at an angle greater than 45° relative to the vertical direction V1). As such, the looped screen 104 may be driven along the looped path in a movement direction M1 such that a portion of the screen 104 on the upstream side S1 of the cleaning assembly 100 moves upward and a portion of the screen 104 on the downstream side S2 of the cleaning assembly 100 moves downward.

For example, as shown in FIG. 4, the flow of harvested crop may be directed from the chopper assembly 50 (FIG. 1) toward the upstream side S1 of the cleaning assembly 100. The flow of air F1 may be strong or fast enough to attract and hold the trash 53 from the flow of harvested crop against the portion of the screen 104 on the upstream side S1 of the cleaning assembly 100, while not being strong enough to hold the heavier billets 51 against the screen 104. The trash 53 may continue to be held against the portion of the screen 104 on the upstream side S1 of the cleaning assembly 100 by the flow of air F as the portion of the screen 104 on the upstream side S1 of the cleaning assembly 100 is moved (e.g., upwardly) towards the first shaft 112, away from cleaned billets 51 falling down towards the elevator assembly 52 (FIG. 1). By moving the trash 53 upward and away from the falling billets 51, the separation of the trash 53 from the crop 51 may generally be improved. When the portion of the screen 104 initially on the upstream side S1 of the cleaning assembly 100 wraps around the first shaft 112 and transitions to the downstream side S2 of the cleaning assembly 100, the flow of air F1 then serves to push the trash 53 off of the screen 104. The trash 53 blown off of the screen 104 at the downstream side S2 of the cleaning assembly 100 may then be directed through a cleaning outlet 122 of the agricultural harvester 10 adjacent the downstream side S2 of the cleaning assembly 100. As trash 53 is continuously cleaned off of the screen 104 as the screen 104 moves along the travel path, the cleaning assembly 100 is self-cleaning.

In some embodiments, the cleaning assembly 100 may have additional self-cleaning elements. For instance, the cleaning assembly 100 may include one or more scrapers (not shown) for removing residues from the screen 104. The scraper(s) may be positioned such that the screen bars 106 periodically rub against the scraper(s) as the screen 104 is moved between the upstream and downstream sides S1, S2 such that any remaining residues after the trash is blown off of the screen 104 are at least partially removed by the scraper(s) to prevent trash from sticking to the screen 104. The scraper(s) may be fixed or may be selectively movable between a cleaning position and a storage position, for instance, based on input by an operator and/or based on data indicative of residues building up on the screen 104.

In one embodiment, an angle-of-attack of the cleaning assembly 100 may be adjustable. The angle-of-attack of the cleaning assembly 100 is generally defined between the vertical direction V1 and a plane extending through the shafts 112, 114 (e.g., along direction D3) and parallel to the second direction D2. For instance, as shown in, FIGS. 2-4, the cleaning assembly 100 is in a neutral position such that an angle-of-attack of the cleaning assembly is zero. As shown in FIG. 5, the cleaning assembly 100 may further include one or more actuators 118 (e.g., a cylinder(s)) that is operable to adjust a position of at least one of the shafts 112, 114 to change the angle-of-attack. For example, the actuator (s) 118 may adjust the angle-of-attack of the cleaning assembly 100 to any angle-of-attack between a first angle-of-attack B1 and a second angle-of-attack B2. When the angle-of-attack is between zero and the first angle-of-attack B1, a vertically higher end of the cleaning assembly 100, proximate the first shaft 112, is positioned closer to the chopper assembly 50 (FIG. 1) than a vertically lower end of the cleaning assembly 100, proximate the second shaft 114. When then angle-of-attack is between zero and the second angle-of-attack B2, the vertically lower end of the cleaning assembly 100, proximate the second shaft 114, is positioned closer to the chopper assembly 50 (FIG. 1) than the vertically higher end of the cleaning assembly, proximate the first shaft 112, such that some of crop 51 may at least partially roll down the screen 104 before reaching the elevator assembly 52.

In some embodiments, the cleaning assembly 100 includes one or more cleaning parameter sensors 120 configured to generate data indicative of a cleaning parameter of the cleaning assembly. For instance, as shown in FIG. 4, one or more first cleaning parameter sensors 120A may be positioned proximate the outlet 122 adjacent the downstream side S2 of the cleaning assembly 100 and configured to generate data indicative of a volume of trash and/or a volume of crop material moved to the downstream side S2 of the cleaning assembly 100. For instance, the first cleaning parameter sensor(s) 120A may include one or a combination of a vision-based sensor (e.g., camera(s), LIDAR device(s), etc.). For example, the vision-based sensor may have a field of view directed toward the downstream side S2 of the cleaning assembly 100 and be configured to generate vision-based data (e.g., image data, a point-cloud data, etc.) indicative of the crop material moved to the downstream side S2 of the cleaning assembly, where such data may be used to determine the volume of trash and/or a volume of crop material moved to the downstream side S2. The first cleaning parameter sensor(s) 120A may additionally, or alternatively, be positioned at the downstream side of the primary extractor assembly 54. Further, one or more second cleaning parameter sensor(s) 120B, such as a vibration sensor(s) (e.g., accelerometer(s), strain gauge(s), etc.), may be configured to generate data indicative of the vibration of a portion 122A of the harvester 10 proximate the downstream side S2 of the cleaning assembly 100 and adjacent the outlet 122, where such data may be monitored to determine when billets 51 are transported to the downstream side S2 of the cleaning assembly 100 and contact the portion of the harvester 10. Similarly, one or more third cleaning parameter sensors 120C (FIG. 6), such as a vision-based sensor(s), may be positioned proximate the elevator assembly 52 (FIG. 1) and configured to generate data indicative of a volume of trash within a flow of harvested crop exiting the elevator assembly 52. Moreover, one or more fourth cleaning parameter sensors 120D (FIG. 6), such as an inclinometer, a gyroscope, and/or the like, may be configured to generate data indicative of an inclination of the agricultural harvester 10 (FIG. 1). Further cleaning parameter sensors 120 may be positioned at any other suitable location within the agricultural harvester.

As will be described below in greater detail, the data indicative of the cleaning parameter(s) (e.g., the volume of trash and/or crop material moved to the downstream side S2 of the cleaning assembly 100, the volume of trash exiting the elevator assembly 52 (FIG. 1), and/or the inclination of the agricultural harvester 10 (FIG. 1)) may be used to adjust the operation of the cleaning assembly 100. For example, the speed of the fan, the speed of the screen drive device, and/or the angle-of-attack of the cleaning assembly 100 may be adjusted based at least in part on the cleaning parameters of the cleaning assembly 100.

It should be appreciated that while the cleaning assembly 100 has been discussed herein as having the screen 104 extending around the two shafts 112, 114, the cleaning assembly 100 may include any other suitable number of shafts, such as one shaft or three or more shafts, about which the screen 104 may extend. Further, it should be appreciated that the shafts 112, 114 may be oriented in any other suitable direction. For instance, the second direction D2 may extend such that the screen is driven to move in a substantially horizontal direction (e.g., where the portions of the screen on the upstream and downstream sides of the assembly move left or right, instead of up or down) between the upstream and downstream sides S1, S2 of the cleaning assembly 100.

Additionally, it should be appreciated that, as indicated above, the cleaning assembly 100 may be used in combination with or in place of the primary extractor assembly 54 to improve the overall efficiency with which trash 53 is separated from the billets 51 and removed from the agricultural harvester 10. For instance, in some embodiments, the cleaning assembly 100 may be positioned within the agricultural harvester 10 as shown in FIG. 1, with the primary extractor assembly 54 extending above the cleaning assembly 100, such that primary extractor assembly 54 directs further trash 53, separate of the trash 53 removed from the flow of harvested crop by the cleaning assembly, from the flow of harvested crop out of the agricultural harvester 10 via the outlet of the housing 55. In one embodiment, the cleaning assembly 100 forms part of the primary extractor assembly 54. For example, the cleaning assembly 100 may be positioned within the primary extractor assembly 54, with the blowing direction D1 of the fan 102 being substantially parallel to the vertical direction, and the second direction D2 extending substantially horizontally. The upstream side S1 of the cleaning assembly 100 may be positioned proximate an inlet of the housing 55 and the downstream side S2 of the cleaning assembly 100 is positioned proximate the outlet of the housing 55. In one embodiment, the cleaning assembly 100 is positioned upstream of the extractor fan 56, with the extractor fan 56 being positioned closer to the outlet of the housing 55 than the downstream side S2 of the cleaning assembly 100, such that the extractor fan 56 helps to further direct the trash 53 moved to the downstream side S2 of the cleaning assembly 100 out of the primary extractor assembly 54. In another embodiment, the extractor fan 56 is positioned upstream of the cleaning assembly 100, the extractor fan 56 being positioned closer to the chopper assembly 50 than the upstream side S1 of the cleaning assembly 100, such that the extractor fan 56 helps to direct the trash 53 toward the portion of the screen 104 on the upstream side S1 of the cleaning assembly 100. Alternatively, the cleaning assembly 100 may replace the extractor fan 56 altogether within the housing 55 of the primary extractor assembly 54.

Figure 6:
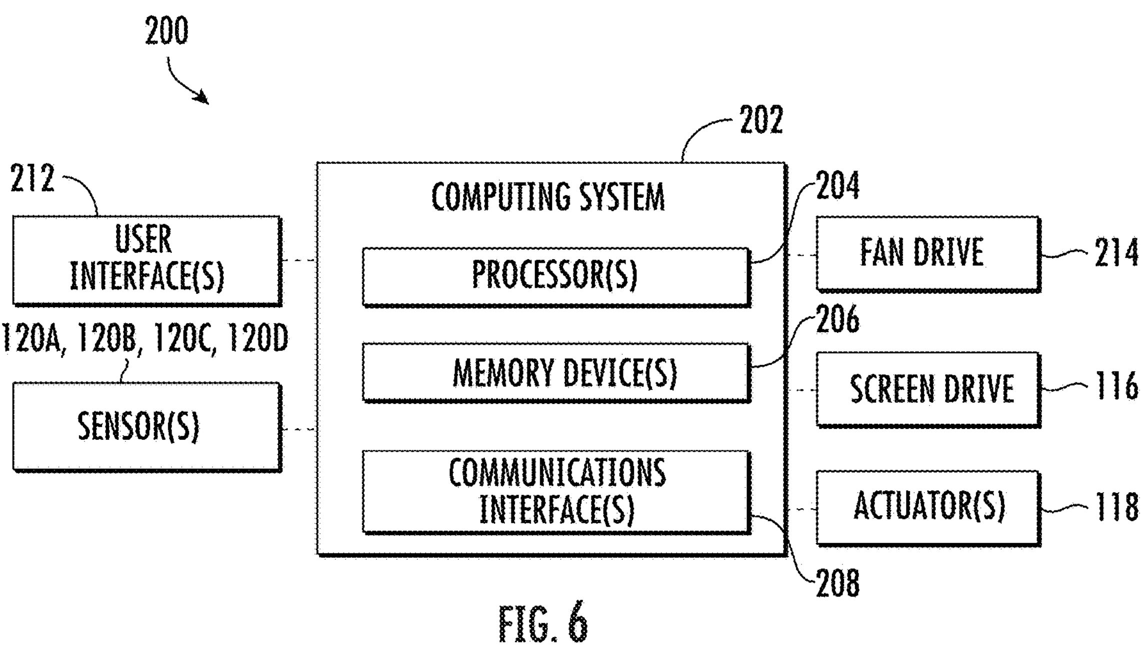
FIG. 6 illustrates a schematic view of a system for removing trash from a flow of harvested crop within an agricultural harvester in accordance with aspects of the present subject matter.

Referring now to FIG. 6, a schematic view of one embodiment of a system 200 for removing trash from a flow of harvested crop within an agricultural harvester is illustrated in accordance with aspects of the present subject matter. In general, the system 200 will be described with reference to the agricultural harvester 10 described with reference to FIG. 1 and the cleaning assembly 100 described with reference to FIGS. 1-5. However, it should be appreciated that the disclosed system 200 may be implemented with harvesters having any other suitable configurations and/or with cleaning assemblies having any other suitable configuration.

In several embodiments, the system 200 may include a computing system 202 and various other components, features, systems and/or sub-systems configured to be communicatively coupled to the computing system 202. In general, the computing system 202 may be configured to perform various computer-related functions or tasks, including, for example, receiving data from one or more components, features, systems and/or sub-systems of the harvester 10, storing and/or processing data received or generated by the computing system 202, and/or controlling the operation of one or more components, features, systems and/or sub-systems of the agricultural harvester 10.

In general, the computing system 202 may comprise any suitable processor-based device known in the art, such as a computing device or any suitable combination of computing devices. Thus, as shown in FIG. 6, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the methods and algorithms that will be described herein. In addition, the computing system 202 may also include various other suitable components, such as a communications circuit or module, one or more input/output channels, a data/control bus and/or the like.

It should be appreciated that, in several embodiments, the computing system 202 may correspond to an existing computing system of the agricultural harvester 10. However, it should be appreciated that, in other embodiments, the computing system 202 may instead correspond to a separate processing device. For instance, in one embodiment, the computing system 202 may form all or part of a separate plug-in module that may be installed within the agricultural harvester 10 to allow for the disclosed system and method to be implemented without requiring additional software to be uploaded onto existing control devices of the agricultural harvester 10.

As further shown in FIG. 6, the system 200 may include a computing system 202 and various other components configured to be communicatively coupled to and/or controlled by the computing system 202. For instance, the computing system 202 may be communicatively coupled to the cleaning parameter sensor(s) 120 (e.g., first, second, third, and/or fourth cleaning parameter sensor(s) 120A, 120B, 120C, 120D) that generate data indicative of various cleaning parameters of the cleaning assembly 100. Further, the computing system 202 may be communicatively coupled to and/or configured to control a user interface 212. The user interface 212 described herein may include, without limitation, any combination of input and/or output devices that allow an operator to provide inputs to the computing system 202 and/or that allow the computing system 202 to provide feedback to the operator, such as a keyboard, keypad, pointing device, buttons, knobs, touch sensitive screen, mobile device, audio input device, audio output device, and/or the like. The computing system 202 may further be communicatively coupled to and/or configured to control one or more fan drive members 214, such as a fan motor. Moreover, the computing system 202 may be communicatively coupled to and/or configured to control the screen drive(s) 116 to adjust the travel speed of the screen 104 along the travel path. Additionally, the computing system 202 may be communicatively coupled to and/or configured to control the actuator(s) 118 configured to adjust the angle-of-attack of the cleaning assembly 100.

Additionally, in some embodiments, the computing system 202 may be configured to include one or more communications modules or interfaces 208 for the computing system 202 to communicate with any of the various system components described herein. For instance, one or more communicative links or interfaces (e.g., one or more data buses) may be provided between the communications interface 208 and the cleaning parameter sensor(s) 120 to allow the computing system 202 to receive data indicative of one or more cleaning parameters of the cleaning assembly from the sensor(s) 120. Similarly, one or more communicative links or interfaces (e.g., one or more data buses) may be provided between the communications interface 208 and the user interface 212 to allow the computing system 202 to receive inputs from the user interface 212 and/or to control the operation of the user interface 212. Moreover, one or more communicative links or interfaces (e.g., one or more data buses) may be provided between the communications interface 208 and the drive devices 116, 214 to allow the computing system 202 to control an operation of the drive devices 116, 214. Additionally, one or more communicative links or interfaces (e.g., one or more data buses) may be provided between the communications interface 208 and the actuator(s) 118 to control the operation of the actuator(s) 118.

In accordance with aspects of the present subject matter, in several embodiments, the computing system 202 may be configured to control an operation of the cleaning assembly 100 to remove trash from a flow of harvested crop within the agricultural harvester 10. For instance, the computing system 202 may generally be configured to control the operation of the screen drive 116 to move the screen 104 along the travel path relative to the fan 102 and to control the operation of the fan drive 214 to rotate the fan 102 to generate the flow of air F1 when the agricultural harvester 10 is in operation, as described above, to remove trash from a flow of harvested crop within the agricultural harvester 10. Additionally, in some embodiments, the computing system 202 may generally be configured to control the operation of the actuator(s) 118 to set the angle-of-attack of the cleaning assembly 100.

In some embodiments, the computing system 202 may be configured to control the screen drive 116, the fan drive 214, and/or the actuator(s) 118 based at least in part on set values. For instance, in one embodiment, the speed at which the screen drive 116 is configured to drive the screen 104 along the travel path, the speed at which the fan drive 214 is configured to rotate the fan, and/or the angle-of-attack of the cleaning assembly 100 set by the actuator(s) 118 may be selected based on one or more static values for the harvesting operation (e.g., based on inputs from the user interface 212 indicative of crop type, preferred aggressiveness, and/or the like or directly indicative of the preferred speeds and/or angle-of-attack).

However, in other embodiments, the computing system 202 may be configured to actively control the screen drive 116, the fan drive 214, and/or the actuator(s) 118 based at least in part on one or more cleaning parameters of the cleaning assembly 100. For instance, one or more suitable relationships and/or algorithms may be stored within the memory 206 of the computing system 202 that, when executed by the processor 204, allow the computing system 202 to determine the cleaning parameter(s) of the cleaning assembly 100, which may then be used to adjust the operation(s) of the screen drive 116, the fan drive 214, and/or the actuator(s) 118. For instance, the relationships and/or algorithms may correlate cleaning parameters, such as a volume of trash and/or crop material moved to the downstream side S2 of the cleaning assembly 100, a volume of trash exiting the elevator assembly 52, and/or an inclination of the agricultural harvester 10, to operating speeds of the drive(s) 116, 214 and/or positions of the actuator(s) 118.

For example, the computing system 202 may be configured to determine the volume of trash and/or crop (billets) moved to the downstream side S2 of the cleaning assembly 100 based at least in part on the data from the first cleaning parameter sensor(s) 120A. For instance, the computing system 202 may include any suitable data processing techniques, relationships, and/or algorithms within its memory 206 that, when executed by the processor 204, allow the computing system 202 to differentiate trash from billets based at least in part on the data from the first cleaning parameter sensor(s) 120A. In some embodiments, the computing system 202 may analyze images from the first cleaning parameter sensor(s) 120A using any suitable image processing techniques. Suitable processing or analyzing techniques may include performing spatial analysis on received images or image data. For instance, geometric or spatial processing algorithms, shape detection and/or edge-finding or perimeter-finding algorithms, and/or the like may differentiate the shape, color, edges, and/or the like of the trash from the crop. The computing system 202 may then determine the volume (or volumetric flow rate) of the trash and/or the volume of the billets at the downstream side S2. The computing system 202 may then compare the volume of trash moved to the downstream side S2 of the cleaning assembly 100 to a threshold volume of trash and/or compare the volume of billets moved to the downstream side S2 of the cleaning assembly to a threshold volume of billets.

If the volume of trash moved to the downstream side S2 of the cleaning assembly 100 is less than the threshold volume of trash, the computing system 202 may generally increase the aggressiveness of the cleaning assembly 100. For example, the computing system 202 may control the operation of the fan drive 214 to increase the fan speed of the fan 102, the operation of the screen drive 116 to increase the travel speed of the screen 104, and/or the actuator(s) 118 to change the angle-of-attack of the cleaning assembly 100. However, if the volume of billets moved to the downstream side of the cleaning assembly 100 is greater than the threshold volume of billets, the computing system 202 may generally decrease the aggressiveness of the cleaning assembly 100. For example, the computing system 202 may control the operation of the fan drive 214 to decrease the fan speed of the fan 102, the operation of the screen drive 116 to decrease the travel speed of the screen 104, and/or the actuator(s) 118 to change the angle-of-attack of the cleaning assembly 100.

Similarly, if one of the cleaning parameter sensors 120A is additionally, or alternatively, configured to generate data indicative of the volume of trash and/or crop (billets) moved to the downstream side of the primary extractor assembly 54, the computing system 202 may determine the volume (or volumetric flow rate) of the trash and/or the volume of the billets at the downstream side of the primary extractor assembly 54. The computing system 202 may then compare the volume of trash moved to the downstream side S2 of the primary extractor assembly 54 to a threshold volume of trash and/or compare the volume of billets moved to the downstream side of the primary extractor assembly 54 to a threshold volume of billets. If the volume of trash moved to the downstream side of the primary extractor assembly 54 is higher than the threshold volume of trash, the computing system 202 may generally increase the aggressiveness of the cleaning assembly 100, as the cleaning assembly 100 is not removing enough trash. If the volume of billets moved to the downstream side of the primary extractor assembly 54 is greater than the threshold volume of billets, the computing system 202 may also generally decrease the aggressiveness of the cleaning assembly 100 and/or the aggressiveness of the extractor fan 56. For example, the computing system 202 may control the operation of the fan drive 214 to decrease the fan speed of the fan 102, control an operation of a fan drive of the extractor fan 56 to decrease the fan speed of the extractor fan 56, the operation of the screen drive 116 to decrease the travel speed of the screen 104, and/or the actuator(s) 118 to change the angle-of-attack of the cleaning assembly 100.

Alternatively, or additionally, the computing system 202 may be configured to determine the volume of crop (e.g., billets) moved to the downstream side S2 of the cleaning assembly 100 based at least in part on the data from the second cleaning parameter sensor(s) 120B. For instance, the computing system 202 may determine that a billet has contacted the portion 122A of the harvester 10 when the vibration data from the sensor(s) 120B indicates a larger magnitude than normal or expected when trash contacts the portion 122A. The computing system 202 may then estimate the volume (or volumetric flow) of billets moved to the downstream side S2 of the cleaning assembly 100. If the volume of billets moved to the downstream side S2 of the cleaning assembly 100 exceeds the threshold volume of billets, the computing system 202 may generally decrease the aggressiveness of the cleaning assembly 100 as described above.

Similarly, the computing system 202 may be configured to determine the volume of trash within or exiting the elevator assembly 52 based at least in part on the data from the third cleaning parameter sensor(s) 120C. For instance, the computing system 202 may be configured to differentiate trash from billets using any suitable image processing techniques on the image data from the third cleaning parameter sensor(s) 120C, and then determine the volume (or volumetric flow rate) of the trash within or exiting the elevator assembly 52. The computing system 202 may then compare the volume of trash within or exiting the elevator assembly 52 to a threshold volume of trash for the elevator assembly 52. When the volume of trash within or exiting the elevator assembly 52 is greater than the threshold volume of trash for the elevator assembly 52, the computing system 202 may generally increase the aggressiveness of the cleaning assembly 100 as indicated above.

Further, the computing system 202 may be configured to determine the inclination of the agricultural harvester 10 based at least in part on data from the fourth cleaning parameter sensor(s) 120D using any suitable technique. For instance, one or more relationships or algorithms may be stored within the memory 206 of the computing system 202 that correlate the data from the fourth cleaning parameter sensor(s) 120D to an inclination of the agricultural harvester 10. The computing system 202 may then control the operation of at least one of the fan drive 214, the screen drive 116, and/or the actuator(s) 118 based at least in part on the determined inclination of the agricultural harvester 10. For example, the computing system 202 may generally control the actuator(s) 118 to tilt the cleaning assembly 100 in a direction opposite the inclination of the agricultural harvester 10 so that the angle-of-attack of the cleaning assembly 100 remains zero (relative to the vertical direction). Further, if the agricultural harvester 10 is inclined in a down-hill direction, the computing system 202 may control the fan drive 214 to increase the speed of the fan 102, control the screen drive 116 to increase the travel speed of the screen 104. Similarly, if the agricultural harvester 10 is inclined in an up-hill direction, the computing system 202 may control the fan drive 214 to decrease the speed of the fan 102, control the screen drive 116 to decrease the travel speed of the screen 104.

Figure 7:
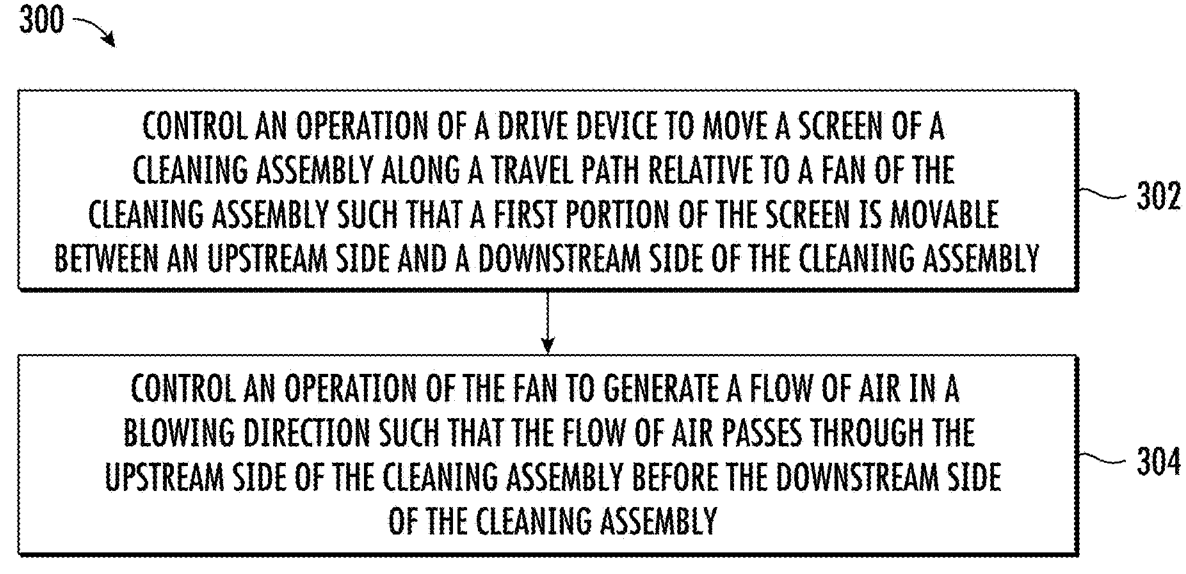
FIG. 7 illustrates a flow diagram of one embodiment of a method for removing trash from a flow of harvested crop within an agricultural harvester in accordance with aspects of the present subject matter.

Referring now to FIG. 7, a flow diagram of one embodiment of a method 300 for removing trash from a flow of harvested crop within an agricultural harvester is illustrated in accordance with aspects of the present subject matter. In general, the method 300 will be described herein with reference to the agricultural harvester 10 described with reference to FIG. 1, the cleaning assembly 100 described with reference to FIGS. 1-5, and the various components of the system 200 described with reference to FIG. 6. However, it should be appreciated that the disclosed method 300 may be implemented with harvesters having any other suitable configurations, with cleaning assemblies having any other suitable configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include controlling an operation of a drive device to move a screen of a cleaning assembly along a travel path relative to a fan of the cleaning assembly such that a first portion of the screen is movable between an upstream side and a downstream side of the cleaning assembly. For instance, as indicated above, the computing system 202 may control an operation of the screen drive 116 to move the screen 104 of the cleaning assembly 100 along a travel path relative to the fan 102 of the cleaning assembly 100 such that a portion of the screen is movable between an upstream side SI and a downstream side S2 of the cleaning assembly 100.

Additionally, at (304), the method 300 may include controlling an operation of the fan to generate a flow of air in a blowing direction such that the flow of air passes through the upstream side of the cleaning assembly before the downstream side of the cleaning assembly. For example, as discussed above, the computing system 202 may control an operation of the fan drive 214 to rotate the fan 102 to generate a flow of air F1 in the blowing direction D1 such that the flow of air F1 passes through the upstream side S1 of the cleaning assembly 100 before the downstream side S2 of the cleaning assembly 100.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for removing trash from a flow of harvested crop within an agricultural harvester, the system comprising:

a chopper assembly; and a cleaning assembly downstream of the chopper assembly relative to the flow of harvested crop, an upstream side of the cleaning assembly being positioned closer to the chopper assembly than a downstream side of the cleaning assembly, the cleaning assembly comprising a screen and a fan, the fan being positioned at least partially between the upstream and downstream sides of the cleaning assembly, the fan being configured to generate a flow of air in a first direction such that the flow of air passes through the upstream side of the cleaning assembly before the downstream side of the cleaning assembly, wherein the screen is movable along a travel path relative to the fan such that a first portion of the screen is movable between the upstream side and the downstream side of the cleaning assembly.

2. The system of claim 1, wherein trash from the flow of harvested crop is held by the flow of air against the first portion of the screen when the screen moves from the upstream side to the downstream side such that the trash is blown off the first portion of the screen when the first portion of the screen is in the downstream side, wherein the trash blown off the first portion of the screen is further directed out of the agricultural harvester via a cleaning outlet, the cleaning outlet being proximate the downstream side of the cleaning assembly.

3. The system of claim 1, wherein the cleaning assembly is upstream of a primary extractor assembly, the primary extractor assembly being configured to direct further trash from the flow of harvested crop out of the agricultural harvester via an outlet of the primary extractor assembly, the further trash being separate of trash removed from the flow of harvested crop by the cleaning assembly.

4. The system of claim 1, wherein the cleaning assembly forms a portion of a primary extractor assembly, the upstream side of the cleaning assembly being positioned proximate an inlet of the primary extractor assembly and the downstream side of the cleaning assembly being positioned proximate an outlet of the primary extractor assembly, the flow of air directing trash moved by the screen to the downstream side of the cleaning assembly out of the agricultural harvester via the outlet of the primary extractor assembly.

5. The system of claim 1, wherein the screen is a looped screen such that the travel path is a looped travel path, the looped travel path defining an interior volume between the upstream and downstream sides of the cleaning assembly, the fan being positioned at least partially within the interior volume.

6. The system of claim 5, wherein the screen comprises a plurality of screen bars, wherein directly adjacent bars of the plurality of screen bars are spaced apart from each other along the travel path by a bar spacing distance.

7. The system of claim 1, wherein the cleaning assembly further comprises:

a first shaft extending along a second direction; and a second shaft extending along the second direction, the first and second shafts being spaced apart, wherein the screen extends in a continuous loop around the first and second shafts.

8. The system of claim 7, wherein the cleaning assembly further comprises an actuator configured to move at least one of the first shaft or the second shaft such that an angle between a vertical direction and a plane extending through the first and second shafts and parallel to the second direction is adjustable.

9. The system of claim 7, wherein the first direction is perpendicular to a plane, the plane extending through the first and second shafts and parallel to the second direction.

10. The system of claim 1, wherein a speed of the fan is adjustable such that a speed of the flow of air is adjustable.

11. The system of claim 1, further comprising a drive device configured to move the screen such that the first portion of the screen moves between the upstream and downstream sides, wherein an operation of the drive device is adjustable such that a travel speed of the screen along the travel path is adjustable.

12. The system of claim 1, further comprising a sensor configured to generate data indicative of at least one of a volume of trash moved to the downstream side of the cleaning assembly, a volume of crop material moved to the downstream side of the cleaning assembly, a volume of trash within a flow of harvested crop exiting an elevator of the agricultural harvester downstream of the chopper assembly, or an inclination of the agricultural harvester.

13. A cleaning assembly for removing trash from a flow of harvested crop within an agricultural harvester, the cleaning assembly comprising:

a screen extending in a continuous loop between an upstream side and a downstream side of the cleaning assembly;

a drive device configured to move the screen along a looped travel path, the looped travel path defining an interior volume between the upstream and downstream sides of the cleaning assembly; and a fan positioned within the interior volume, the fan being configured to generate a flow of air in a first direction such that the flow of air passes through the upstream side of the cleaning assembly before the downstream side of the cleaning assembly.

14. The cleaning assembly of claim 13, wherein the screen comprises a plurality of screen bars extending longitudinally in a second direction between a first end and a second end, a first loop connected to each of the plurality of screen bars proximate the first ends of the plurality of screen bars, and a second loop being connected to each of the plurality of screen bars proximate the second ends of the plurality of screen bars.

15. The cleaning assembly of claim 14, wherein directly adjacent bars of the plurality of screen bars are spaced apart from each other along the first and second loops by a bar spacing distance.

16. The cleaning assembly of claim 13, further comprising:

a first shaft extending along a second direction; and a second shaft extending along the second direction, the first and second shafts being spaced apart, wherein the screen extends in a continuous loop around the first and second shafts.

17. The cleaning assembly of claim 16, wherein at least one of the first shaft or the second shaft is movable such that an angle between a vertical direction and a plane extending through the first and second shafts and parallel to the second direction is adjustable.

18. The cleaning assembly of claim 13, wherein a speed of the fan is adjustable such that a speed of the flow of air is adjustable.

19. The cleaning assembly of claim 13, wherein an operation of the drive device is adjustable such that a travel speed of the screen along the looped travel path is adjustable.

20. A method for removing trash from a flow of harvested crop within an agricultural harvester using a cleaning assembly downstream of a chopper assembly of the agricultural harvester relative to the flow of harvested crop, an upstream side of the cleaning assembly being positioned closer to the chopper assembly than a downstream side of the cleaning assembly, the cleaning assembly comprising a screen and a fan, the fan being positioned at least partially between the upstream and downstream sides of the cleaning assembly, the method comprising:

controlling, with one or more computing devices, an operation of a drive device to move the screen along a travel path relative to the fan such that a first portion of the screen is movable between the upstream side and the downstream side of the cleaning assembly; and controlling, with the one or more computing devices, an operation of the fan to generate a flow of air in a blowing direction such that the flow of air passes through the upstream side of the cleaning assembly before the downstream side of the cleaning assembly.

* * * * *